(12) United States Patent
Goelz et al.

(10) Patent No.: US 12,706,507 B2
(45) Date of Patent: Aug. 11, 2026

(54) ARCHITECTURAL STRUCTURE COVERING WITH MAGNET-BASED BRAKING SYSTEM

(71) Applicant: Hunter Douglas Inc., New York, NY (US)

(72) Inventors: William F. Goelz, Pearl River, NY (US); Joshua A. Johnson, Pearl River, NY (US); Robert E. Fisher, Pearl River, NY (US); Daniel A Huber, Pearl River, NY (US)

(73) Assignee: Hunter Douglas Inc., New York, NY (US)

( * ) Notice: Subject to any disclaimer, the term of this patent is extended or adjusted under 35 U.S.C. 154(b) by 184 days.

(21) Appl. No.: 18/570,776

(22) PCT Filed: May 27, 2022

(86) PCT No.: PCT/US2022/031439

§ 371 (c)(1),
(2) Date: Dec. 15, 2023

(87) PCT Pub. No.: WO2022/265843

PCT Pub. Date: Dec. 22, 2022

(65) Prior Publication Data

US 2024/0291349 A1 Aug. 29, 2024

Related U.S. Application Data

(60) Provisional application No. 63/212,539, filed on Jun. 18, 2021.

(51) Int. Cl.
*H02K 7/106* (2006.01)
*E06B 9/322* (2006.01)
(Continued)

(52) U.S. Cl.
CPC ............ *H02K 7/106* (2013.01); *E06B 9/322* (2013.01); *H02K 7/003* (2013.01);
(Continued)

(58) Field of Classification Search
CPC .............................. H02K 7/106; H02K 7/003
(Continued)

(56) References Cited

U.S. PATENT DOCUMENTS 4,864,199 A 9/1989 Dixon
5,467,266 A * 11/1995 Jacobs .................. B60J 1/2041 700/83

(Continued)

FOREIGN PATENT DOCUMENTS

WO 2005085578 A2 9/2005
WO WO-2021258022 A1 * 12/2021 ............... E06B 9/90

OTHER PUBLICATIONS

Supplementary European Search Report for Application No. EP 22825531.1, mailed Jul. 3, 2025, 10 pages.

(Continued)

*Primary Examiner* — Kristina R Fulton
(74) *Attorney, Agent, or Firm* — Dority & Manning, P.A.

(57) ABSTRACT

Examples of the present disclosure relate to various aspects of architectural structure coverings. A particular aspect relates to using controlling a motorized architectural covering that includes a motor and a magnetic brake. In an example, a shaft of the motor is controlled to enter a rest position, in which south and north poles of the magnetic brake are aligned.

20 Claims, 11 Drawing Sheets

(51) Int. Cl.
*H02K 7/00* (2006.01)
*E06B 9/68* (2006.01)
*E06B 9/72* (2006.01)

(52) U.S. Cl.
CPC ................. *E06B 2009/3222* (2013.01); *E06B 2009/6818* (2013.01); *E06B 9/72* (2013.01)

(58) Field of Classification Search
USPC ....................................................... 160/84.02
See application file for complete search history.

(56) References Cited

U.S. PATENT DOCUMENTS 6,794,778 B1 * 9/2004 Walker ...................... E06B 9/90 310/152
10,174,553 B2 * 1/2019 Mugnier ................... E06B 9/15
2004/0090201 A1 * 5/2004 Cavarec .................... E06B 9/68 318/16
2011/0005689 A1 * 1/2011 Coleman .............. H02H 7/0851 318/434
2013/0269887 A1 10/2013 Skinner et al.
2015/0226001 A1 * 8/2015 Adams ...................... E06B 9/32 160/84.02
2016/0032647 A1 2/2016 Adreon et al.
2023/0203882 A1 * 6/2023 Friman ..................... E06B 9/72 160/310

OTHER PUBLICATIONS

Application No. PCT/US2022/031439, International Preliminary Report on Patentability, Mailed on Dec. 28, 2023, 6 pages.
Application No. PCT/US2022/031439, International Search Report and Written Opinion, Mailed on Sep. 22, 2022, 10 pages.

* cited by examiner

400

Best Attractive Force = Best Holding
Inner magnet wants to stay stationary

Potential Energy Still Exists
Inner Magnet Still Wants to Rotate

700

ARCHITECTURAL STRUCTURE COVERING WITH MAGNET-BASED BRAKING SYSTEM

CROSS-REFERENCES TO RELATED APPLICATIONS

This application is a national phase entry of International Patent Application No. PCT/US2022/031439, entitled "ARCHITECTURAL STRUCTURE COVERING WITH MAGNET-BASED BRAKING SYSTEM," filed May 27, 2022, which claims priority to and the benefit of U.S. Provisional Patent Application No. 63/212,539, entitled "ARCHITECTURAL STRUCTURE COVERING WITH MAGNET-BASED BRAKING SYSTEM," filed on Jun. 18, 2021, the contents of the above-noted applications are incorporated herein by reference in their entirety.

BACKGROUND

Architectural structure coverings, such as blinds, shades, shutters, and drapes, provide shading and privacy. Some architectural structure coverings may be manually operable (e.g., through use of a lift cord), while other architectural structure coverings may be motorized (e.g., by an electronic motor). A motorized architectural structure covering typically includes a motor for controlling the movement of the motorized architectural structure covering. Stopping the movement and maintaining the motorized architectural structure covering can be challenging.

It is with respect to these and other general considerations that the aspects disclosed herein have been made. Also, although relatively specific problems may be discussed, it should be understood that the examples should not be limited to solving the specific problems identified in the background or elsewhere in this disclosure.

BRIEF DESCRIPTION OF THE DRAWINGS

Non-limiting and non-exhaustive examples are described with reference to the following figures.

DETAILED DESCRIPTION

Architectural structure coverings are typically placed over an architectural structure, for example, but not limited to, windows, doors, and doorways, etc. An architectural structure covering can include a motor having a motor shaft coupled with one or more components of the architectural structure covering (e.g., a shade). The motor can move (e.g., rotate, extend, retract, etc.) the component(s) by rotating the motor shaft. Operations of the motor (e.g., to close or open the shade) can be remotely controlled by a user device, such as, but not limited to, a remote control device, a mobile computing device (e.g., smartphone or remote control), a tablet computing device, among other electronic devices. A magnetic brake can be used to hold the motor shaft in a rest position such that the component(s) can be maintained in a stationary position. The rest position can maximize the North-South magnetic attraction for a minimum potential energy position.

If in the rest position, the North and South poles of the magnetic brake are misaligned, the motor shaft may start rotating again, causing a drift to the component(s). Depending on the configuration of the architectural structure covering (e.g., one that has vertical shade), the drift can become significant (e.g., the weight of the shade causes it to extend downward in the vertical position).

To maintain the motor shaft in the rest position and reduce and/or avoid the drift, embodiments of the present disclosure are directed to a controlled braking that causes alignment of the north and south poles of the magnetic brake. For example, in normal operation, the motor can move the component(s) by rotating the motor shaft. Thereafter, a user request can be received (or some other trigger can be determined) to stop the movement. The motor shaft can be held in place for a short period of time, after which the motor shaft can be slightly and controllably rotated to allow the north-south pole alignments. The motor shaft is then held in the rest position based on the alignment.

Figure 1:
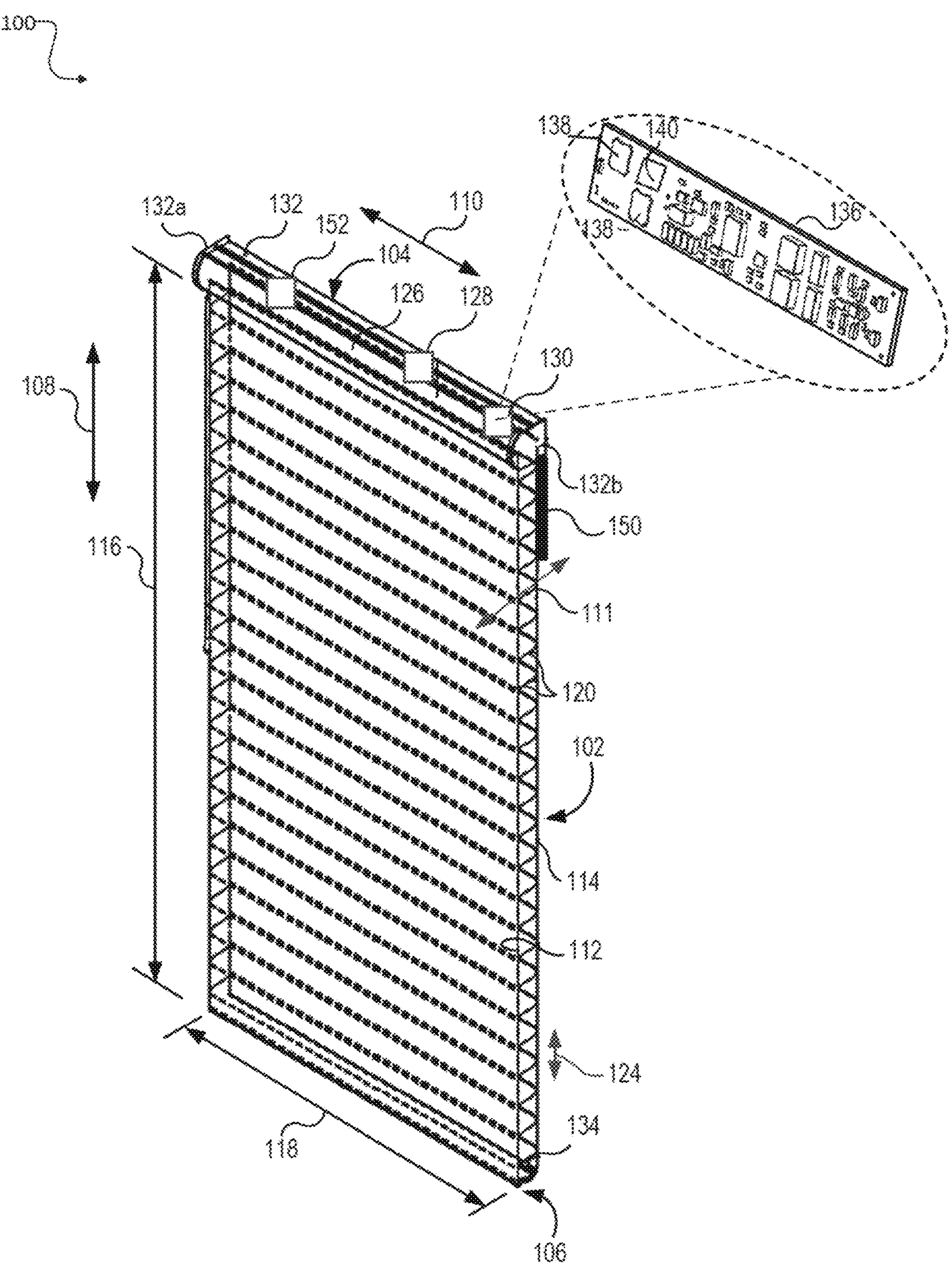
FIG. 1 illustrates a perspective view of an example architectural structure covering in an open and extended configuration, according to embodiments of the present disclosure.

FIG. 1 illustrates a perspective view of an exemplary architectural structure covering 100 in an open and extended configuration. The architectural structure covering 100 includes a covering load that can be coupled directly or indirectly to a motor of the architectural structure covering 100 when the architectural structure covering 100 is motorized. The covering load generally refers to a load that can be moved to cover and uncover a structure, such as a window, a door, a wall, or any other structure. In the illustration of FIG. 1, the covering load is a shade panel 102 configured to extend vertically between a roller assembly 104 and a bottom rail assembly 106. The shade panel 102 is generally configured to be moved vertically 108 relative to the roller assembly 104 between a fully lowered or extended position (e.g., as illustrated in FIG. 1) and a fully raised or retracted position (not shown). When the architectural structure covering 100 is in its retracted position, the shade panel 102 may be configured to expose an adjacent architectural structure (e.g., a window), and when the covering 100 is in its extended position, the shade panel 102 may be configured to cover the adjacent architectural structure. Additionally, the covering 100 is configured to move the shade panel 102 to any number of intermediate positions defined between the fully retracted and fully extended positions so that the shade panel 102 partially covers the adjacent architectural structure. Although a vertical movement is described, the embodiments are not limited as such. For example, the shade panel 102 can be extended and retracted horizontally. Furthermore, other types of covering loads are possible.

In the example, it should be appreciated that, as used herein, the term "vertical" generally describes the orientation or arrangement of the architectural structure covering 100 in its extended position as indicated by arrow 108, such as when the covering 100 is mounted for use relative to an adjacent architectural structure. As such, movement in a vertical direction describes movement of the bottom rail assembly 106 toward or away from head rail 132, as indicated by arrow 108. Similarly, the term "horizontal" generally describes a direction perpendicular to vertical 108 that extends side-to-side relative to the covering 100, as illustrated by arrow 110. Further, the term "cross-wise" generally describes a direction perpendicular to both vertical 108 and horizontal 110 and extends front-to-back relative to the covering 100, as illustrated by arrow 111. The various directional references used herein are simply utilized to provide context to the examples shown, and thus, should not be construed as otherwise limiting. For instance, some architectural structure coverings 100 may have its shade panel 102 configured to extend and retract in the horizontal direction.

In some examples, the shade panel 102 includes both a front panel 112 and a back panel 114, with the front and back panels 112 and 114 being configured to be arranged generally parallel to each other in the vertical direction 108 and when the shade panel 102 is moved to its fully extended position (shown in FIG. 1). In general, the panels 112 and 114 are formed from any material suitable for use within the disclosed covering 100, such as a textile, a woven and/or non-woven fabric, and/or the like. However, in some examples, one or both of the panels 112 and 114 are formed from a sheer fabric or other suitable material(s) that allows at least a portion of the light hitting the shade panel 102 to pass from one panel to the other. Additionally, it should be appreciated that the front and back panels 112 and, 114 may generally be sized, as required or desired, to use relative to any suitable architectural structure. For example, the panels 112 and 114 define a vertical height 116 and/or a horizontal width 118 sufficient to cover a window or other architectural structure. In one example, the front and back panels 112 and 114 define substantially the same height 116 and/or width 118 such that the panels 112 and 114 are substantially coextensive when the shade panel 102 is in its fully extended position.

The shade panel 102 also includes a plurality of light blocking members or vanes 120 that extend between the front and back panels 112 and 114, with the vanes 120 being spaced apart vertically from one another along the vertical height 116 of the shade panel 102. In some examples, each vane 120 is configured to extend the full depth or cross-wise direction 111 between the front and back panels 112 and 114. For example, each vane 120 includes a front edge coupled to the front panel 112 and a back edge coupled to the back panel 114 using any suitable means, such as stitching, sticking, adhesives, mechanical fasteners, and/or the like. Additionally, similar to the panels 112 and 114, the vanes 120 are formed from any material suitable for use within the disclosed covering 100, such as a textile, a woven and/or non-woven fabric, and/or the like. However, in some examples, the vanes 120 are formed from a material used to form the front and back panels 112 and 114. For example, each vane 120 is formed from a light blocking or opaque material or a translucent material.

In operation, when the shade panel 102 is positioned in its fully extended position (shown in FIG. 1), the relative positioning of the front and back panels 112 and 114 may be adjusted such that the vanes 120 are tilted to control the amount of light passing through the shade panel 102 as required or desired. In some examples, the shade panel 102 is configured such that, when the front and back panels 112 and 114 are moved vertically 108 relative to each other (e.g., when the back panel 114 is raised and the front panel 112 is simultaneously lowered or when the back panel 114 is lowered and the front panel 112 is simultaneously raised), the orientation or tilt angle of the vanes 120 defined between the front and back panels is adjusted. For example and as illustrated in FIG. 1, the vanes 120 are tilted to a substantially horizontal position between the panels 112 and 114 such that a vertical light gap 124 is defined between each adjacent pair of vanes 120 and the vanes 120 are in a fully opened configuration. In this opened position, light passes directly through the light gaps 124 defined between the vanes 120. Alternatively, the vanes 120 may be tilted to an at least partially overlapping, substantially vertical position between the panels 112 and 114 such that the vanes 120 are in a fully closed configuration (not shown). In this closed position, the overlapping vanes 120 serve to prevent all or a portion of the light hitting the shade panel 102 from passing through the shade panel 102.

Additionally, the vanes 120 may be tilted to any number of intermediate tilt positions defined between the fully open and fully closed positions. The orientation of the vanes 120 between and including the fully open and fully closed configurations, can also be referred to as the view through position. It should be appreciated that in one example, the vanes 120 are spaced apart from one another and/or dimensioned such that, when moved to the fully opened position, the vanes 120 are oriented substantially horizontally 110 between the vertically hanging panels 112 and 114, and when moved to the fully closed position, the shade panel 102 has a collapsed configuration in which both the vanes 120 and the panels 112 and 114 hang in a substantially vertical 108 orientation.

The roller assembly 104 of the architectural structure covering 100 includes an operating mechanism 126 configured to support the shade panel 102 and control the extension and retraction of the shade panel 102 between its fully extended and fully retracted positions. In addition, operating mechanism 126 controls the tilt of the vanes 120 between their fully opened and fully closed positions. In some examples, the operating mechanism 126 is covered by a valance or other suitable covering. For instance and as illustrated in FIG. 1, the roller assembly 104 includes a head rail or cover 132 and corresponding endcaps **132*a* and 132*b* configured to at least partially encase the operating mechanism 126. Moreover, various other components of the roller assembly 104 may also be configured to be housed within the head rail 132 as required or desired. In the example, the operating mechanism 126 includes a single assembly (e.g., a motor 128 and a controller 130) that drives the extension and retraction movements of the shade panel 102 and the opening and closing movements of the vanes 120. In other examples, the operating mechanism 126** may have separate assemblies to drive the extension and retraction movements and the opening and closing movements, respectively.

It should be appreciated that one example of an architectural structure covering 100 is illustrated and described in FIG. 1. The architectural structure covering 100, however, may be any type of covering that at least partially covers an architectural element, such as a window, a door, an opening, a wall, etc. In one example, the architectural structure covering 100 can be a shear-type covering. In an aspect, the shade panel has sheer front and back panels that extend and retract, and a plurality of light blocking vanes extending between the panels that tilt to open and close the covering. In another aspect, the shade panel has a single sheer panel that extends and retracts, and a plurality of light blocking vanes attached to the sheer panel that open and close by sliding one end of the vane relative to the panel. In yet another aspect, the shade panel has a single sheer panel that extends and retracts, and a plurality of light blocking vanes that extend substantially vertically that rotate to open and close.

In another example, the architectural structure covering 100 can be a cellular-type covering. In an aspect, the shade panel has a front and back panel that are connected to each other in a cellular pattern (e.g., a honeycomb-type pattern, a roman-type pattern, etc.) and that extend and retract in an accordion-type motion. This type of cellular pattern creates a layer of insulation (e.g., air) within the covering.

In yet another example, the architectural structure covering 100 can be a roman-type covering. In an aspect, the shade panel has a single panel with a plurality of fabric folds that extends and retracts via a rolling motion (e.g., rolling the folds) or a stacking motion (e.g., stacking the folds). In another aspect, the shade panel has a front and back panel connected in a cellular pattern as described above and that extends and retracts. These panels include excess fabric to generate the roman-type folds when the covering is retracted, and are not necessarily configured to move in an open and close direction.

In still another example, the architectural structure covering 100 can be a roller-type covering. In an aspect, the shade panel has a front and back panel connected in a cellular pattern as described above, but extend and retract via a rolling motion. In another aspect, the shade panel has a single panel that extends and retracts in a rolling motion. This type of single panel can be fully or partially light blocking as required or desired, and are not necessarily configured to move in an open and closed direction. In other examples, the single panel can be a UV-blocking shade. In yet another aspect, the shade panel has a front and back panel that each have alternating sheer and light blocking bands. In this example, the shade panel is extended and retracted by a rolling motion, and also open and closed by moving the panels relative to one another.

Additionally or alternatively, the architectural structure covering 100 can be a shutter-type covering. In an aspect, the shade panel has a plurality of light blocking vanes that tilt to open and close the covering, and are not necessarily configured to move in an extended and retracted direction. The architectural structure covering 100 can be a slat-type covering. In an aspect, the shade panel has a plurality of light blocking vanes (e.g., slats) that move relative to each other to extend and retract the covering, and tilt to open and close the covering. The architectural structure covering 100 can also be a vertical-type covering. In an aspect, the shade panel has a plurality of light blocking vanes (e.g., panels or louvers) that move relative to each other in a horizontal direction to extend and retract the covering, and rotate to open and close the covering. Generally, the architectural structure covering 100 can be any type of covering that is enabled to extend and retract and/or open and close as described herein.

In the example, the operating mechanism 126 is electronic and motorized so that the architectural structure covering 100 is remotely operable as required or desired. The controller 130 of the operating mechanism 126 includes one or more printed circuit boards 136 for operably controlling movement of the shade panel 102 via the motor 128. The circuit board 136 electronically communicates via wired or wireless communication with the motor 128 that drives movement of the shade panel 102 and includes the electrical components (e.g., an architectural structure covering controller, such as architectural structure covering controller 142 of FIG. 2) for operating architectural structure covering 100. The circuit board 136 and/or motor 128 may be powered by a combination of internal and/or external power line connections, battery(ies), fuel cells, solar panels, wind-powered generators, and/or any other power sources as required or desired. The circuit board 136 includes one or more sensors 138 so as to determine a position of the operating mechanism 126 and thus, a position of the shade panel 102 (e.g., an extended/retracted and/or open/close position) and shade. Additionally, the circuit board 136 includes a communication device 140, such as a transmitter, a receiver, a transceiver, and/or other interface to facilitate exchange of data with remote devices (e.g., user device 212 of FIGS. 3 and 4).

In operation, the architectural structure covering 100 receives operational instructions from a remote device and process and respond to the received instructions accordingly. For example, user devices may control movement of the operating mechanism 126 so as to extend or retract and/or open or close the shade panel 102 and control movement of the lift assembly so as to extend or retract the shade panel 102 as required or desired.

Figure 2:
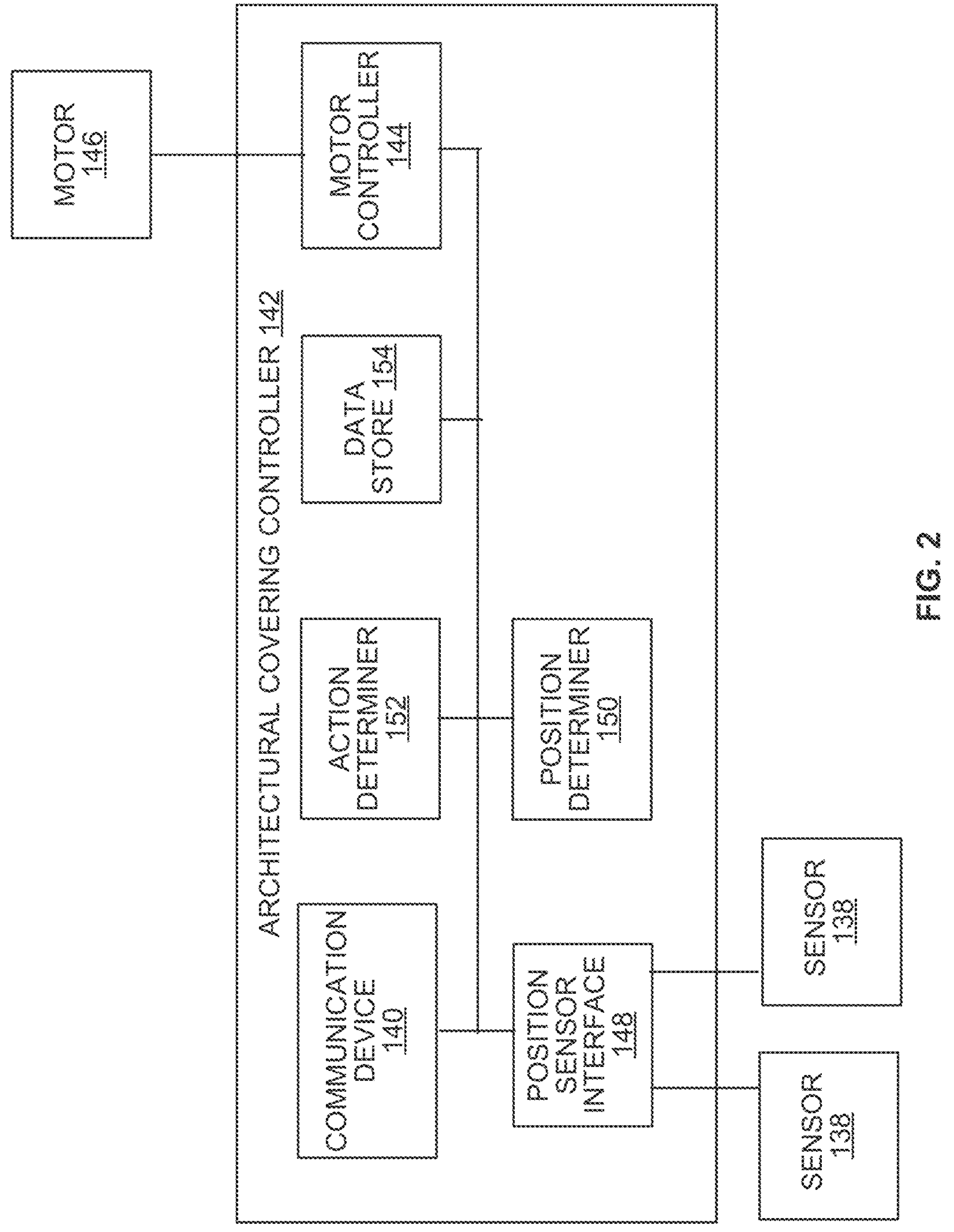
FIG. 2 illustrates a block diagram of an example architectural structure covering controller of the architectural structure covering shown in FIG. 1, according to embodiments of the present disclosure.

FIG. 2 illustrates a block diagram of an exemplary architectural structure covering controller 142 of the architectural structure covering 100 (shown in FIG. 1). In the example described below, the architectural structure covering controller 142 is described in connection with the operating mechanism 126 (shown in FIG. 1); however, it is understood that the controller 142 may likewise be used to control any other component of the architectural structure covering 100 as required or desired. In some aspects, the architectural structure covering controller 142 is implemented on the circuit board 136 (shown in FIG. 1).

In the example, the architectural structure covering controller 142 includes a motor controller 144 that controls one or more motors 128 of the assembly based on one or more commands. For example, the motor controller 144 controls the direction of rotation of an output shaft of the motor 128, the speed of the output shaft, and/or other operations of the motor so as to extend and retract and/or open and close the shade panel 102 (shown in FIG. 1).

The architectural structure covering controller 142 also includes a position sensor interface 148 that receives signals from the position sensors 138. The position sensor 138 may include, for example, a magnetic encoder, a rotary encoder, or a gravitational sensor. The position sensor 138 may be used to count pulses or rotations of the motor 128, to track the position of a rotating element (e.g., the output shaft, the roller assembly 104 (shown in FIG. 1), etc.) while movement of the covering is being driven (e.g., by a rotating member or any other driving member). The position sensor interface 148 processes the signals from the position sensor 138 and a position determiner 150 determines a position of the architectural structure covering 100 (shown in FIG. 1) based on the processed signal(s) from the position sensor interface 148.

An action determiner 152 is used to determine what action (if any) is to be performed by the motor 128 based on input information from the communication device 140 (e.g., receiving operational instructions from a remote device) and/or the position determiner 150. For example, if an operational signal is received by the communication device 140 to open the covering, the action determiner 152 sends a signal to the motor controller 144 to activate the motor 146 in an open direction. Similarly, if an operational signal is received by the communication device 140 to close the covering, the action determiner 152 sends a signal to the motor controller 144 to activate the motor 146 in a closed direction.

In some examples, an upper limit position and/or a lower limit position is used to prevent the motor 146 from moving the covering beyond a set position in either direction (e.g., open and closed). For example, if the position determiner 150 determines that the covering has reached an upper limit position (e.g., a position at or near fully opened), the action determiner 152 commands the motor controller 144 to cease activation of the motor 146. This prevents the covering from moving too far in a manner that may otherwise cause undesirable wear on the motor 146 and/or the covering itself. Similarly, a lower limit position is used to prevent the motor 146 from closing the covering too far in the opposite direction. In another example operation, the architectural structure covering controller 142 controls the motor 146 to move the architectural structure covering to a predetermined position (e.g., a stored or favorite position). For example, the predetermined position may be a midpoint location between the upper limit position and the lower limit position. Based on the received operational control signal, the action determiner 152 and the position determiner 150 selectively uses the motor controller 144 to command the motor 146 in one direction or another so that the covering is moved to the predetermined position.

The upper limit position, lower limit position, and/or predetermined position(s) can be stored in a data store 154 (e.g., memory) of the architectural structure covering controller 142. In some examples, the positions are reprogrammed by a user as required or desired.

Figure 3:
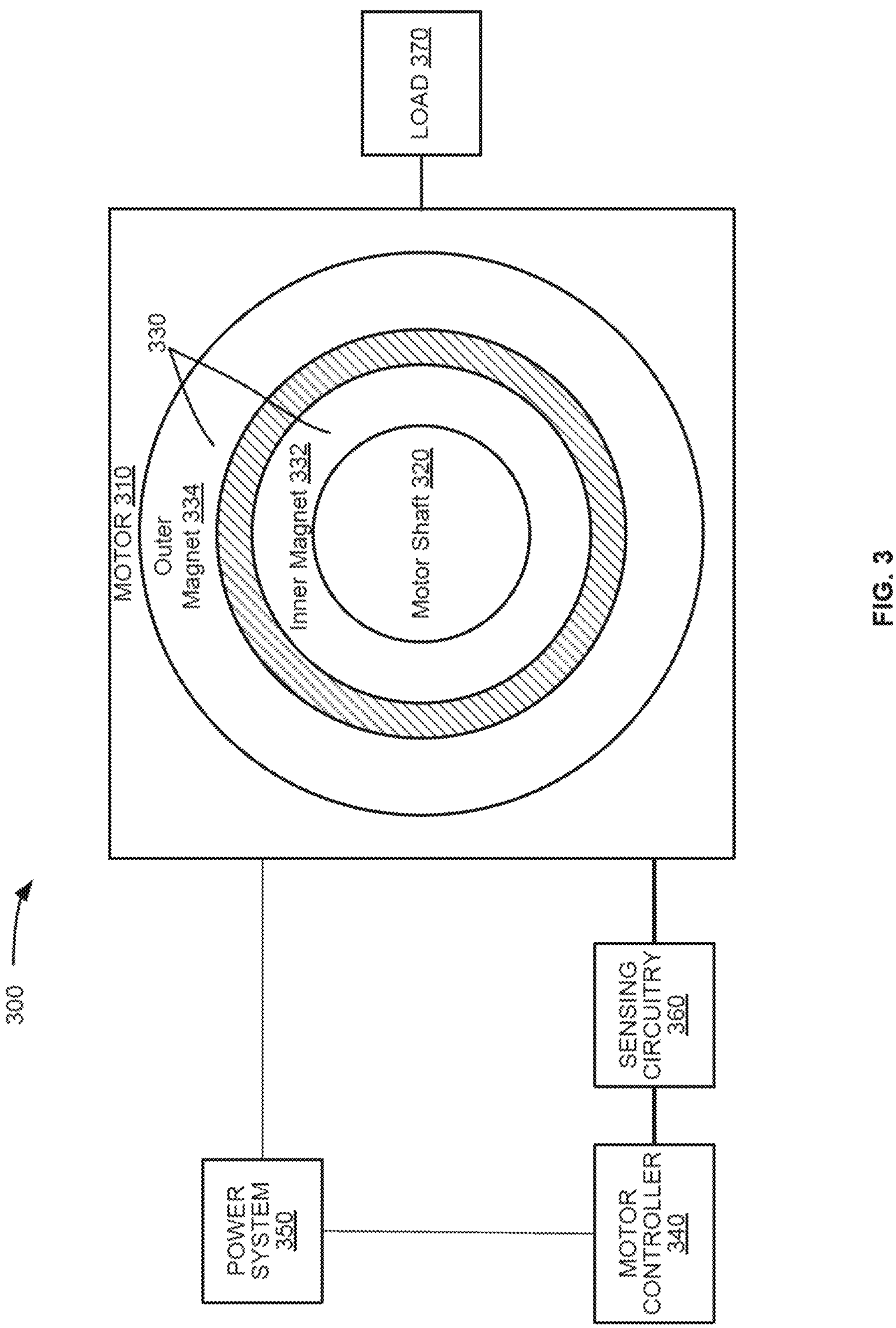
FIG. 3 illustrates an example motor system that includes a motor with a magnetic brake, according to embodiments of the present disclosure.

FIG. 3 illustrates an example motor system 300 that includes a motor with a magnetic brake, according to embodiments of the present disclosure. The motor system 300 represents an assembly of the motor 128 and motor controller 144 (and/or architectural structure covering controller 142) described in FIG. 1. As illustrated, the motor system 300 includes a motor 310, a motor controller 340, a power system 350, and a sensing circuitry 360. The motor 310 may be attached to a load 370, such as, for instance, a roller assembly 104, a component of the roller assembly 104 (e.g., a roller tube), and/or some other movable components of the architectural structure covering 100 of FIG. 1. In an example, the motor is an AC motor or a DC motor (which can be a brushless DC motor) that includes a rotor and a stator. The rotor can be attached to the load 370, whereas the stator can remain stationary.

In an example, the rotor is located on a motor shaft 320 of the motor 300 or can be the same as the motor shaft 320. The motor 310 also includes a braking system. In an example, the braking system includes a magnetic brake 330. In the illustration of FIG. 3, the magnetic break 330 includes a pair of diametrically polarized magnets, shown as an inner magnet 332 and an outer magnet 334. The inner magnet 332 has relatively a smaller diameter than the outer magnet 334. Both magnets are centered around the motor shaft 320. For example, the inner magnet 332 can surround and be disposed longitudinally on the entire or a portion of the motor shaft 320 and can rotate with the rotation of the motor shaft 320. The outer magnet 334 can also surround the entire, the same, or a different portion of the motor shaft 320 and can remain stationary while the motor shaft 320 (and the inner magnet 332) rotate. For example, the outer magnet 334 can be attached to a stationary part of the motor 310. As further illustrated in the next figures, each magnet can include multiple alternate north/south oriented magnets, such as five south-oriented magnets and five north-oriented magnets, where a south-oriented magnet is disposed between two north-oriented magnets and, conversely, a north-oriented magnet is disposed between two south-oriented magnets. Of course, a different number of south- and north-oriented magnets can be used. In addition, the inner magnet 332 and the outer magnet 334 need not have the same number of south- and north-oriented magnets.

The motor controller 340 provides controls over operations of the motor 310, such as by controlling the supply of electrical energy from the power source 350 to the motor 310, such as by adjustably sending an amount of electrical current to the motor 310 (e.g., by controlling the flow of electrical current to the motor 310). In an example, the motor 310 can include a printed circuit board (PCB) having at least one of a processor, a memory, a digital signal processor (DSP), and a field-programmable gate array (FPGA), or a combination of such computing components. The power source 350 can be a direct current (DC) power source and may include converters (such as step-up converters and step-down converters) and switches (e.g., implemented as a set of switching transistors to support three-hundred eighty degrees conduction) such that the electrical energy is controllably supplied using a pulse width modulation (PWM) technique. The sensing circuitry 360 is employed to detect rotor position, rotor speed, motor current, or motor terminal voltages. In an example, the sensing circuitry 360 is used in a proportional-integral-derivative (PID) control loop and can include, among other components, a position sensor.

In an example, the sensing circuitry 360 includes one or more position sensors, such as Hall effect sensors and/or optical sensors, and one or more current sensors. Magnet pole and rotor position can be detected by a Hall effect sensor. The speed and rotor position can be calculated and precisely controlled, accordingly. An optical sensor can measure an angular displacement or position of the motor relative to a stationary portion of the user device or the motor 310. For example, an optical index may mount to the stationary portion and the optical sensor may mount to the rotor. As the motor 310 rotates, the optical sensor may image the optical index to determine the position. A current sensor can be a low-side current sensor, a high-side current sensor, or an in-line phase current sensor. In an example, the sensing circuitry 360 can monitor an encoder pulse-based count to determine whether motion (e.g., rotation of the rotor shaft 320) has fully stopped or not. This count refers to the individual encoder pulses using output data of a Hall effect sensor and an encoder magnet.

Figure 4:
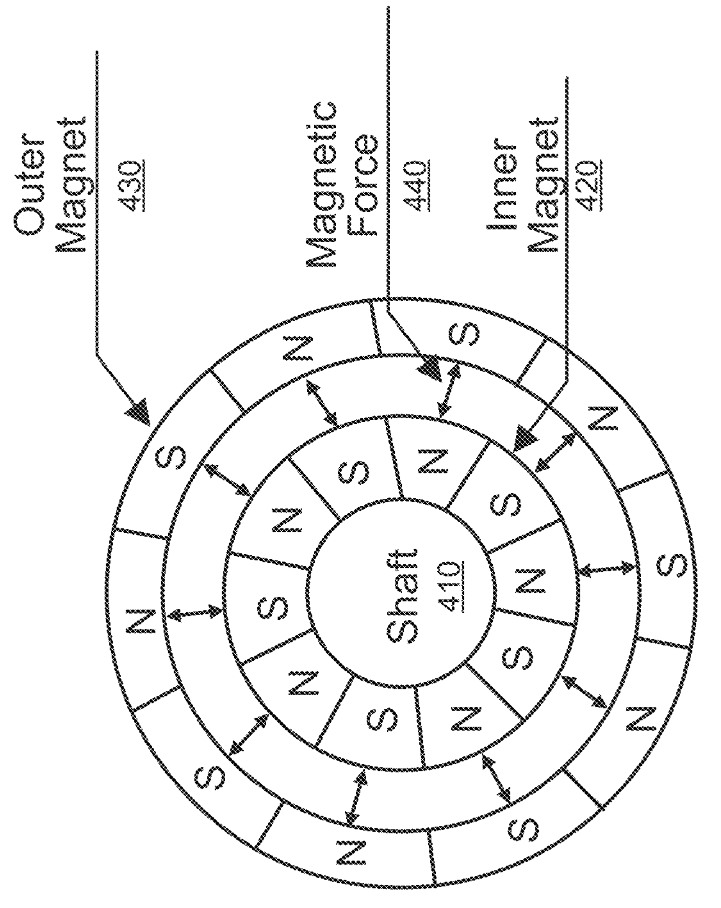
FIG. 4 illustrates an example system that holds a motor shaft in a maximum hold position, according to embodiments of the present disclosure.

FIG. 4 illustrates an example system 400 that holds a motor shaft 410 in a maximum hold position, according to embodiments of the present disclosure. The system 400 can be part of a motor, such as the motor 310 of FIG. 3, and can include a braking system, such as the braking system 300 of FIG. 3. In turn, the braking system can include an inner magnet 420 and an outer magnet 430. In the illustration of FIG. 4, each of the inner magnet 420 and the outer magnet 430 includes the same number of south-oriented magnets (for a total of five in each) and north-oriented magnets (for a total of five in each). Within each of the inner magnet 420 and outer magnet 430, the size of the south- and north-oriented magnets can be the same (as shown in FIG. 4) or can be different (e.g., the north-oriented magnets can be made larger than the south-oriented magnets, or vice versa, in the inner magnet 420 and/or the outer magnet 430). The sizes and/or geometries of the south-oriented magnets and north-oriented magnets can differ between the inner magnet 420 and/or the outer magnet 430 to allow for arranging the inner magnet 420 around and on the shaft 410 and the arrangement of the outer magnet 430 around the inner magnet 420 with a space gap in between. Air can fill the space gap, although a material can be disposed in between the two magnets 420 and 430 to create surface frictions.

A magnetic force 440 exists between the inner magnet 420 and the outer magnet 430 and can be exhibited in the space gap. The strength and orientation of the magnetic force 440 depends on the alignment of the of the two magnets 420 and 430 (in particular, depending on the alignment of the south- and north-oriented magnets of the inner magnet 420 and the south- and north-oriented magnets in the outer magnet 430) and on the relative distance between them (e.g., the space gap distance).

As illustrated in FIG. 4, the maximum hold position provided by the braking system corresponds to when the north-oriented magnets of the inner magnet 420 are aligned with the south-oriented magnets of the outer magnet 430 and, likewise, the south-oriented magnets of the inner magnet 420 are aligned with the north-oriented magnets of the outer magnet 430. In this north-to-south and south-to-north alignment, the magnetic force 440 represents the highest attractive force between the inner magnet 420 and the outer magnet 440 and the lowest potential energy. In this low energy state, the two magnets 420 and 430 hold with a fairly high degree of torque resistance, thereby providing the maximum hold position of the motor shaft 410.

Figure 5:
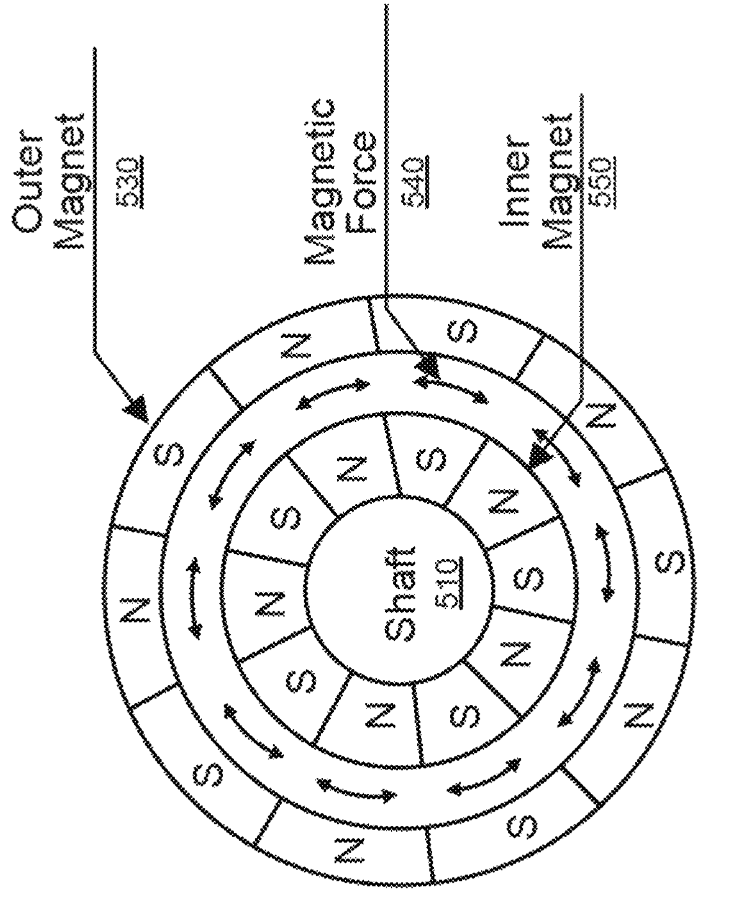
FIG. 5 illustrates an example system that holds a motor shaft in a minimum hold position, according to embodiments of the present disclosure.

FIG. 5 illustrates an example system 500 that holds a motor shaft 510 in a minimum hold position of, according to embodiments of the present disclosure. The system 500 can be part of a motor, such as the motor 310 of FIG. 3, and can include a braking system, such as the braking system 300 of FIG. 3. In turn, the braking system can include an inner magnet 520 and an outer magnet 530. Similar to the example arrangement shown in FIG. 4, in the illustration of FIG. 5, each of the inner magnet 520 and the outer magnet 530 includes the same number of south-oriented magnets (for a total of five in each) and north-oriented magnets (for a total of five in each). A magnetic force 540 exists between the inner magnet 520 and the outer magnet 530 and can be exhibited in the space gap.

As illustrated in FIG. 5, the minimum hold position provided by the braking system corresponds to when the north-oriented magnets of the inner magnet 520 are aligned with the north-oriented magnets of the outer magnet 530 and, likewise, the south-oriented magnets of the inner magnet 520 are aligned with the south-oriented magnets of the outer magnet 530. In this north-to-north and south-to-south alignment, the magnetic force 540 represents the lowest attractive force between the inner magnet 520 and the outer magnet 540 and the highest potential energy. In this high energy state, the two magnets 520 and 530 tend to repel away from each other, whereby the inner magnet 420 can rotate, thereby providing the minimum hold position of the motor shaft 510.

Figure 6:
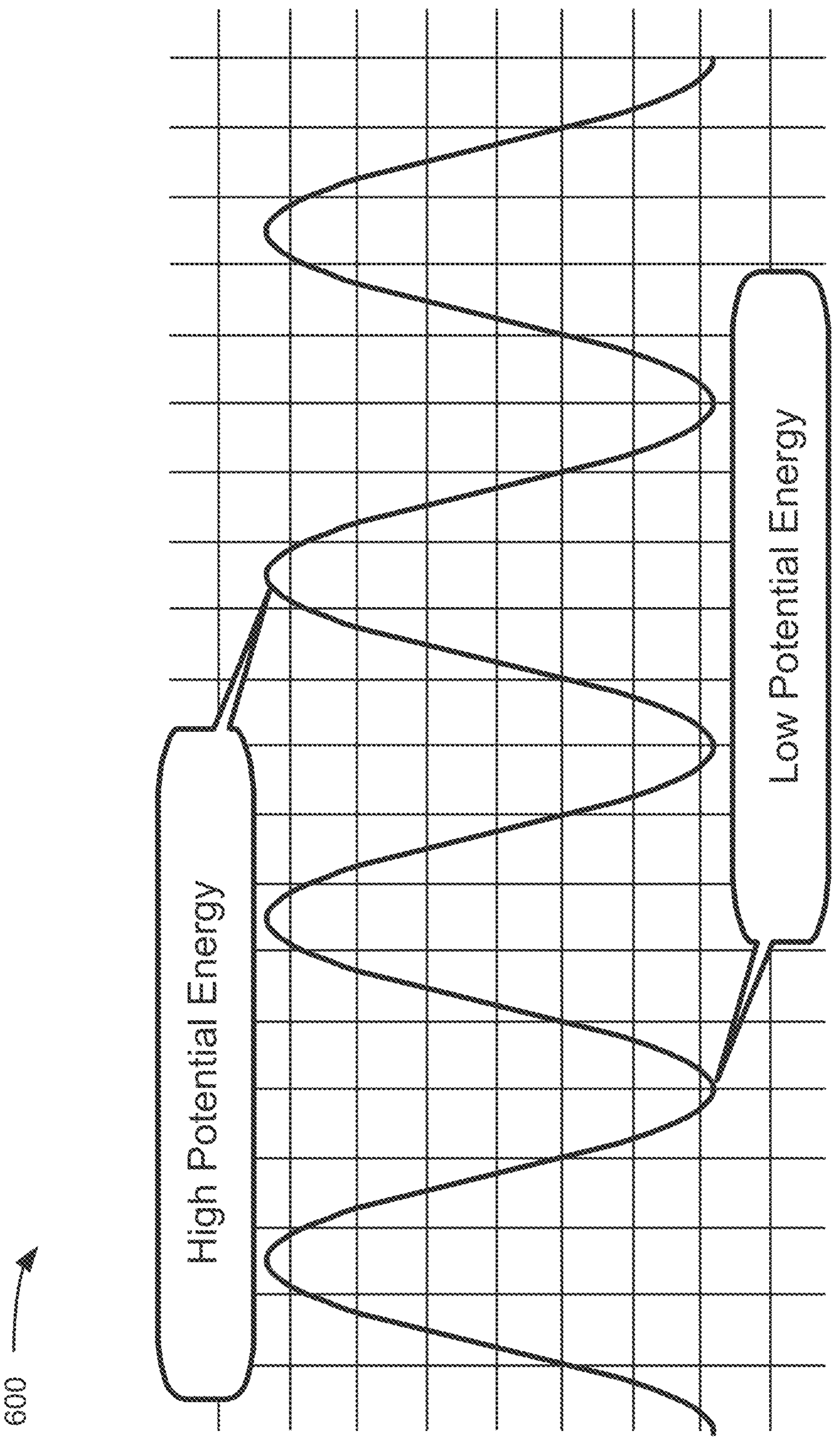
FIG. 6 illustrates an example motor shaft rotation between high and low potential energies, according to embodiments of the present disclosure.

FIG. 6 illustrates an example motor shaft rotation 600 between high and low potential energies, according to embodiments of the present disclosure. In the illustration of FIG. 6, the motor shaft rotation is a three-hundred sixty degree rotation (e.g., a full turn) that has five high potential energy positions and five low potential energy positions. In other words, when the motor shaft rotates (e.g., based on an application of an electrical current from a power source by a motor controller), the motor shaft rotation 600 appears to alternate in a sinusoidal fashion between high and low potential energy positions. These potential energy positions correspond to the use of five south- and five north-oriented magnets in each of the inner magnet and the outer magnet, as illustrated in FIGS. 4-5. Of course, if a different number and/or geometries (varying the size of the north- and south-oriented magnets) was used, the number of potential energy peaks and valleys and the overlap shape of the illustrated waveform can be different.

When the motor is running (e.g., based on the controlled application of the electrical current), the magnetic field attraction does not inhibit motion (e.g., the motor shaft rotation 600) due to the inertia of the system and the rapidly changing magnetic attraction/repulsion forces. However, as the axial rotation velocity of the rotor magnet (or equivalently, the motor shaft) slows down, then the attractive and repulsive forces are much more noticeable. In other words, the axial rotation velocity can be controlled in two ways: the application of an electrical current and the alignment of the inner and outer magnets. When the electrical current is large enough, the axial velocity is high, and the effect of the attractive and repulsive forces due to the magnetic alignment is not as relevant. When the electrical current is small, the axial velocity is also small, and the effect of the attractive and repulsive forces due to the magnetic alignment becomes as relevant. At this low speed, depending on the type of alignment, the rotor shaft can be slowly rotated (e.g., in the case of north-to-north and south-to-south alignment that provides the low potential energy) or held in place (in the case of north-to-south and south-to-north alignment that provides the high potential energy).

The motor itself may not determine exact stopping position of the brake system as the magnet pole locations may not be in sync with the cogging position of the internal motor magnets. Therefore, it is a potential that when the motor shaft stops rotating (e.g., given the reduction or stoppage of the electrical current flow to the motor), a misalignment between the inner magnet and outer magnet exists, and thus, the motor shaft may not stop at the minimum energy position. The misalignment can correspond to an arrangement of the inner and outer magnets, where the arrangement is other than the north-to-south and south-to-north alignment.

Figure 7:
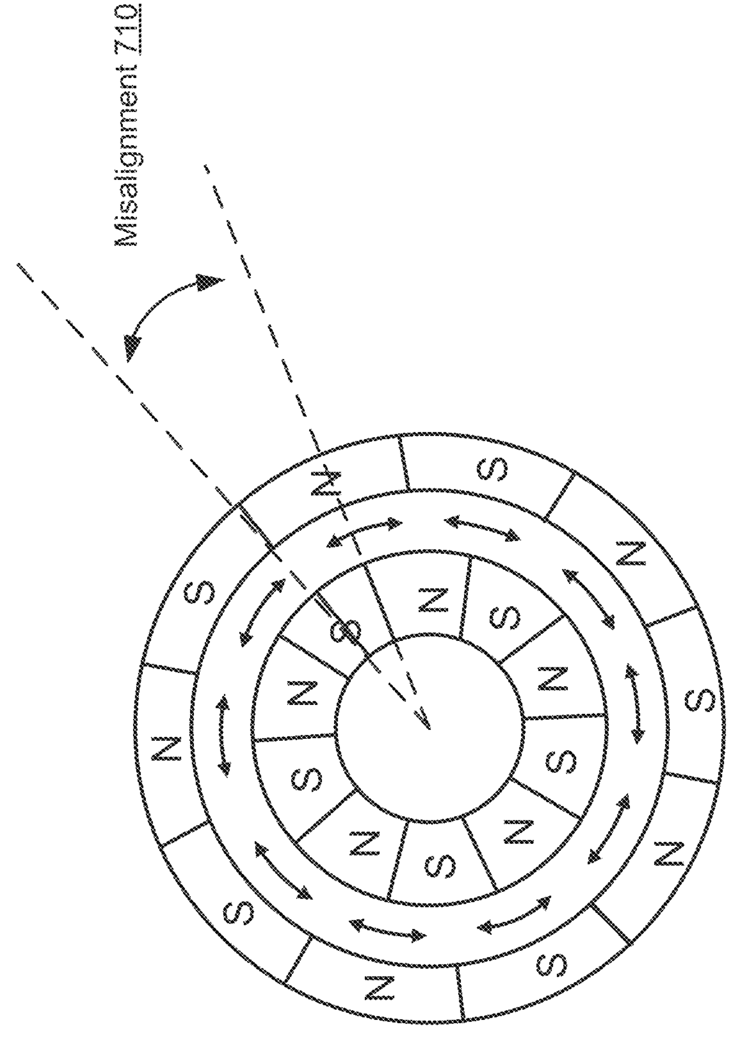
FIG. 7 illustrates example motor shaft hold position that may cause a drift, according to embodiments of the present disclosure.

FIG. 7 illustrates an example motor shaft hold position 700 that may cause a drift, according to embodiments of the present disclosure. The motor shaft hold position 700 can be a position at which a motor shaft is stopped, whereby the inner and outer magnets of the motor braking system are misaligned (e.g., the arrangement is other than a north-to-south and south-to-north alignment). The misalignment 710 can cause the inner magnet to rotate towards the north-to-south and south-to-north alignment. In parallel, the electrical current flow may have been reduced or stopped. Given this magnetic-based rotation and the weight of the load, a momentum may exist, thereby causing the motor shaft to exit the motor shaft hold position 700 and start rotating. In other words, if the magnet pair stops at anything but a direct north-south orientation, (due to other frictional or pre-load forces in the system), there is a chance the weight of the shade could urge the magnetic brake away from holding ability. Once it bypasses the low energy position, the shade can begin to drift due to momentum.

To illustrate, consider an example of a motor mechanically coupled to a roller tube for winding down and winding up a shade. The motor supports motion operations in a motor-drive mode and a back-drive mode. In the motor-drive mode, the motor's controller adjustably sends an amount of electrical current to the motor (e.g., controls the flow of the electrical current to the motor) such that the motor can rotate its motor shaft between different positions, thereby moving winding down or up the shade (depending on the rotational direction). In the back-drive mode, the motor controller may reduce the amount of the electrical current (e.g., stop the flow of the electrical current to the motor). Accordingly, in the back drive mode, momentum applied to the motor shaft can cause its rotation and the winding down of the shade.

With the above illustrative example in mind, consider the following scenario. The motor is operating in the drive-mode to rotate the motor shaft in a first rotational direction and wind up the shade. A user request is received to stop the shade retraction. In response, the motor stops the flow of the electrical current and the motor is now in the back-drive mode. However, it happens that the motor shaft position corresponds to the misalignment 710. Accordingly, the inner magnet rotates towards the north-to-south and south-to-north alignment. It happens that this rotation is in a second rotational direction opposite to the first one. Due to the weight of the shade and the fact that the motor is now in the back-drive mode, the resulting momentum applied to the motor shaft causes its rotation in the second rotational direction, thereby winding down the shade. Depending on the momentum and the strength of the magnetic force, this rotation can be more than one turn and, potentially, can cause the shade to wind down completely. The distance difference between the shade's initial stop position and final stop position can be referred to as a drift (e.g., a distance drift). Equivalently, the rotational differences (e.g., in number of turns) between the rotor's initial hold position 700 and the final position can be referred to as a drift (e.g., rotational drift).

Figure 8:
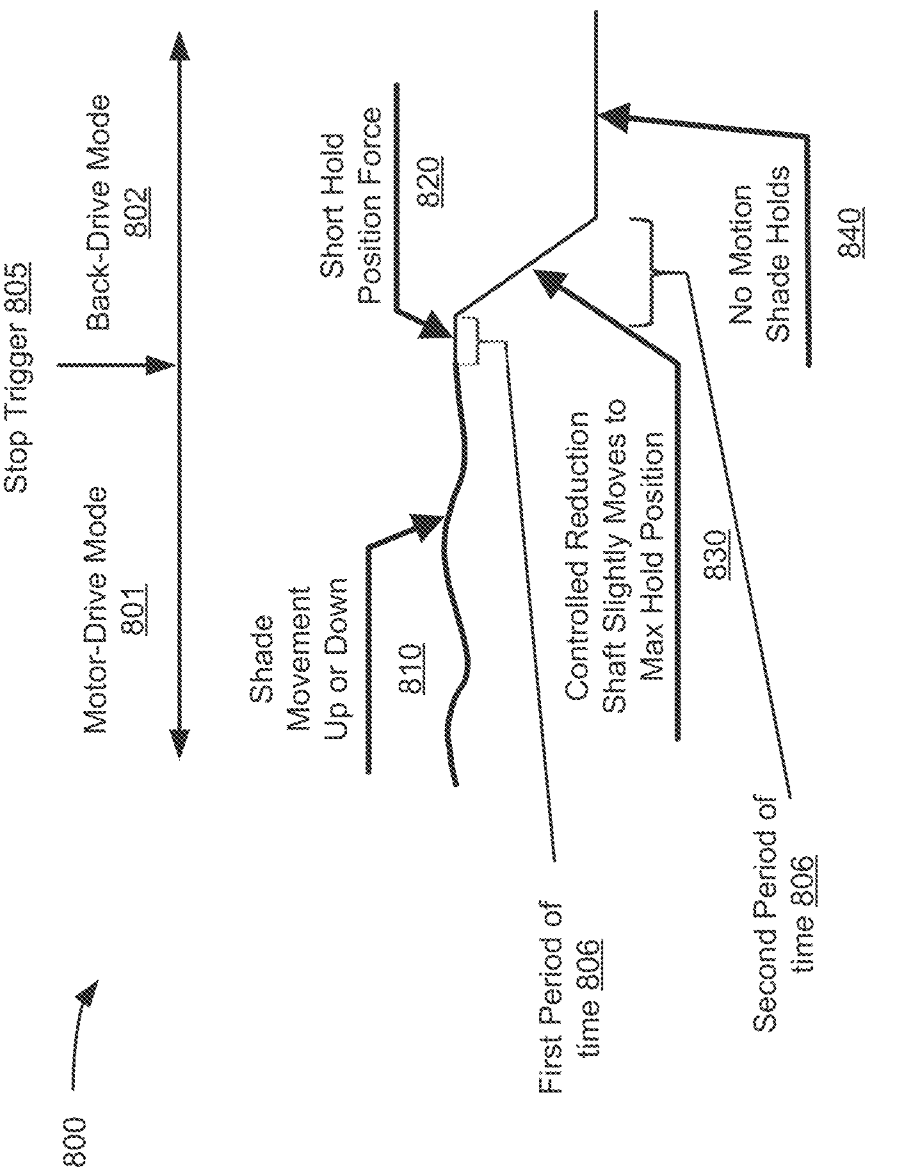
FIG. 8 illustrates an example current-based control to rotate a motor shaft into a maximum hold position, according to embodiments of the present disclosure.

FIG. 8 illustrates an example current-based control 800 to rotate a motor shaft into a maximum hold position, according to embodiments of the present disclosure. In order to arrest the motion of a load (e.g., a shade as described in the illustrative example of FIG. 7), it is beneficial to provide a short hold position force where the motor control (e.g., software, representing logic, stored and executed thereon), manage the flow of the electrical current to the motor to maintain a no motor shaft rotation condition, allowing any load inertia to come to rest. After the short holding pause, a gradual reduction of the electrical current (e.g., as controlled by the motor controller) allows the motor shaft and brake magnets to slowly increment to the next possible north/south alignment or low potential energy position providing maximum holding power. In the illustrative examples of FIG. 5-7, each one of the inner and outer magnets includes ten magnets and, thereby the north-to-south and south-to-north alignment can be quickly effectuated in order to quickly achieve the low potential energy position and the maximum holding power.

The increase of the holding torque on the motor is multiplied by the gearbox ratio of the motor (e.g., 121:1, 150:1, or 69:1) to provide maximum holding torque for a heavy load. Therefore, optimizing the holding location of the brake system nets many times the holding ability of the motor, gearbox, brake system.

In the illustration of FIG. 8, a motor can operate in a motor-drive mode 801 and a back-drive mode 802. While operating in the motor-drive mode 801, the motor controller controls the flow of electrical current to the motor, causing the motor shaft to rotate. The rotation can occur over multiple cycles. In each cycle, the arrangement between inner and outer magnets of the brake system changes between north-to-south and south-to-north alignment and north-to-north and south-to-south alignment, corresponding to low potential energy and high potential energy positions, similar to the cycle illustrated in FIG. 6.

The motor controller determines a stop trigger 805 to stop the rotation of the motor shaft, which corresponds to existing the motor-drive mode 801 and entering the back-drive mode 802. Different types of the stop trigger 805 are possible. For example, a user request can be received from a user device. In another example, a position sensor can determine that the load (e.g., shade) has reached a final position (e.g., an upper limit position). In yet another example, a proximity or other type of sensor can detect an obstacle.

Upon detecting the stop trigger 805, the back-drive mode 802 is entered. At the start of the back-drive mode 802, the motor controller reduces the flow of the current from an operational range to a first amount for a first short period of time 806 in order to hold the motor shaft in a first hold position. The period of time 806 can be, for example, a few milliseconds up to a second. The amount of the current may be smaller than the operational range of the motor-drive mode 801, but larger than a first threshold amount (e.g., more than zero amps). At the end of the period of time 806, the load inertia comes to a rest, whereby the load (and the rotor shaft) are held in place by a short hold position force 820. In an example, the rotation of the motor shaft is monitored by a set of sensors (e.g., an encoder pulse-based count). Upon sensor data of the sensor indicating that the motor shaft has stopped rotation, the motor controller can determine that the load is held in place and can move to the gradual reducing of the amount of the electrical current as further described herein next.

After the first short period of time 806, and while the motor is still operating in the motor-drive mode 802, the motor controller gradually reduces the amount of current from the first amount to a second amount during a second period of time 807. The second amount is reached at the end of the second period of time 807 and can be, in an example, zero amps. The second period of time 807 may, but need not, be longer than the first first short period of time 806, such as by being between one-hundred milliseconds and a second or a few seconds. During the second period of time 807, the inner magnet is rotated (along with the motor shaft) such that a north-to-south and south-to-north alignment is achieved with the outer magnet, resulting in a maximum hold position 830 by at least the end of the second period of time 807.

After the second short period of time 807, and while the motor is still operating in the motor-drive mode 802, the motor controller may maintain the current flow at the second amount (e.g., which is zero amps in one example). The maximum hold position 830 maintains the motor shaft and the load in their stationary positions (shown in FIG. 8 as a no motion shade holds 840).

Figure 9:
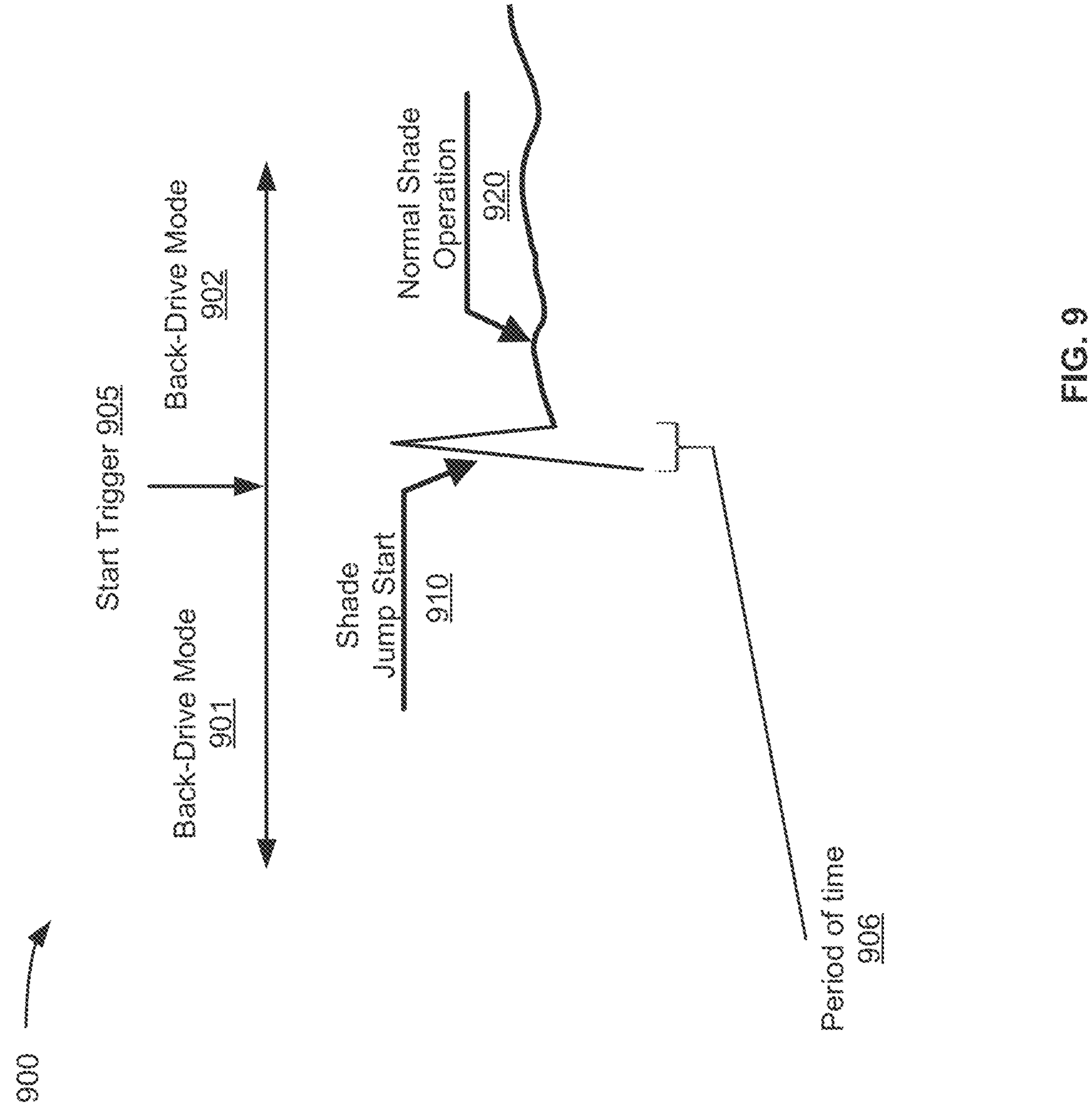
FIG. 9 illustrates an example current-based control to rotate a motor shaft out of a maximum hold position, according to embodiments of the present disclosure.

FIG. 9 illustrates an example current-based control 900 to rotate a motor shaft out of a maximum hold position, according to embodiments of the present disclosure. Generally, to get a load (e.g., shade) moving, the motor controller provides for a jumpstart to get the motor (e.g., the rotor shaft with the magnet pairs) off of the low energy position for slow speeds, and can then settle into a constant run velocity (at low or high speeds) for counteracting any magnetic braking interference during normal shade operation.

In the illustration of FIG. 9, a motor can operate in a back-drive mode 901 and a motor-drive mode 902. While operating in the back-drive mode 901, the motor shaft and the load (e.g., shade) are stationary. At some point, the motor controller determines a start trigger 905 to start the rotation of the motor shaft and the movement of the load (e.g., to wind up or down the shade), which corresponds to existing the back-drive mode 901 and entering the motor-drive mode 902. Different types of the start trigger 905 are possible. For example, a user request can be received from a user device. In another example, a sensor can detect a pull or a push.

Upon detecting the start trigger 905, the motor-drive mode 902 is entered. At the start of the back-drive mode 902, the motor controller increases the flow of the current to provide a targeted jumpstart (illustrated as a shade jumpstart 910). The flow can be ramped up a trajectory to get to the desired movement speed over a period of time 906. The period of time 906 can range between a few hundred-milliseconds to two seconds or a few seconds. During that time the motor brakes free, whereby the rotor shaft can start rotating. In an example, this rotation can be monitored by a set of sensors (e.g., an encoder pulse-based count). Once the rotation is detected or a certain rotational velocity is detected, the motor controller can begin normal operation of the motor (illustrated in FIG. 9 as a normal shade operation 920).

While operating in the normal operation (which is a second stage of the motor-drive mode 902), the motor controller controls the flow of electrical current to the motor, causing the motor shaft to rotate. The rotation can occur over multiple cycles. In each cycle, the arrangement between inner and outer magnets of the brake system changes between north-to-south and south-to-north alignment and north-to-north and south-to-south alignment, corresponding to low potential energy and high potential energy positions, similar to the cycle illustrated in FIG. 6.

Figure 10:
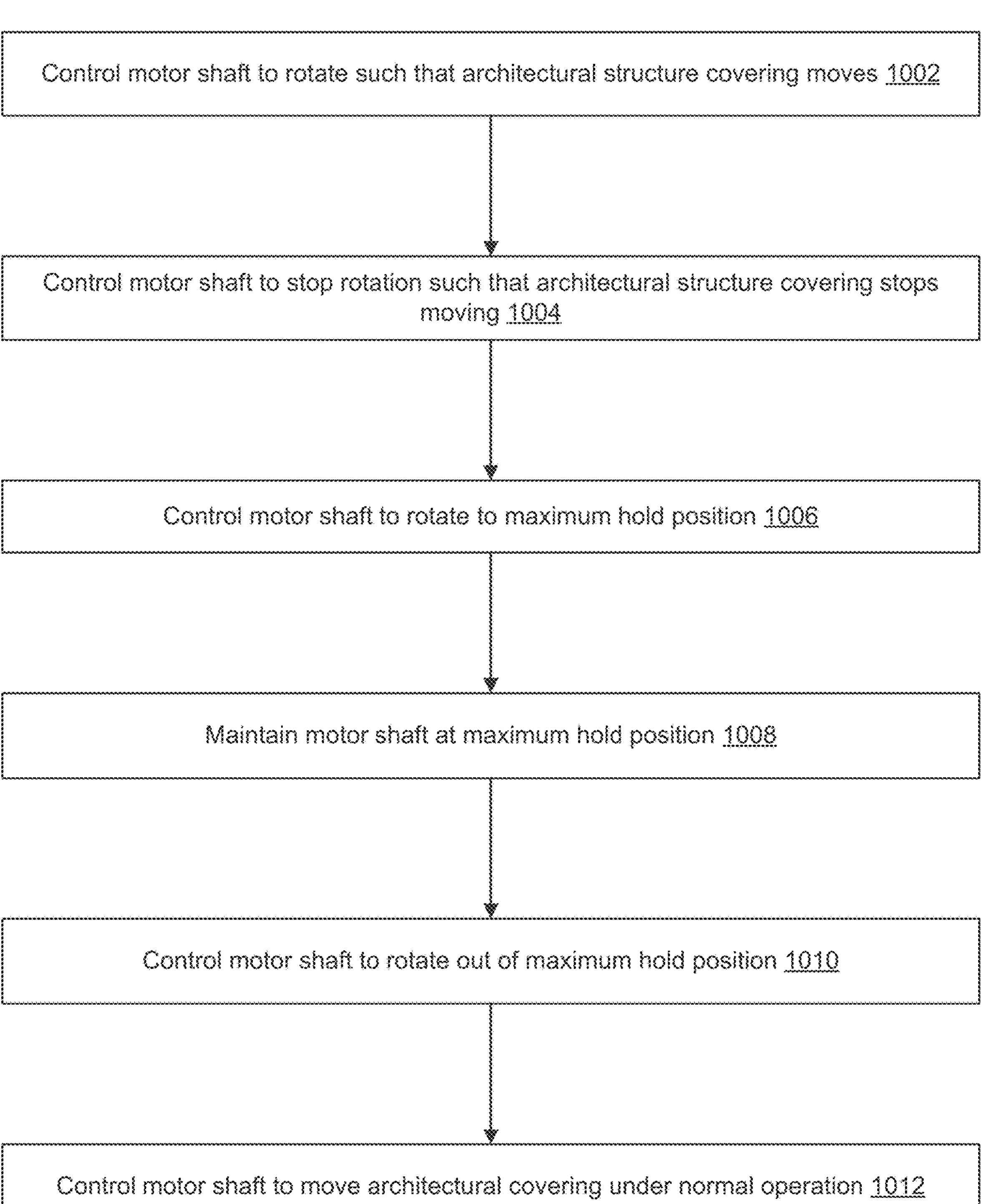
FIG. 10 illustrates an example flow for controlling a motor that has a magnetic-brake, according to embodiments of the present disclosure.

FIG. 10 illustrates an example flow 1000 for controlling a motor that has a magnetic-brake, according to embodiments of the present disclosure. The flow 1000 can be defined as logic of the motor controller (e.g., program code or software stored on and executable by the motor controller). Generally, the logic brings the motor to a slow stop, and allows the brake system to find its low energy state. This approach can be universal to (e.g., the control logic can be used across) various size shades, different fabric weights, and variable loads from top to bottom of a shade.

Operations of the flow 1000 can be performed by the motor controller, which can be a component (e.g., a processor, a microprocessor, a central processing unit (CPU), a field-programmable gate array (FPGA), etc.) of an architectural structure covering, such as the architectural structure covering of FIG. 1. Some or all of the instructions for performing the operations can be implemented as hardware circuitry and/or stored as computer-readable instructions on a non-transitory computer-readable medium of the motor controller. As implemented, the instructions represent modules that include circuitry or code executable by the motor controller. The use of such instructions configures the motor controller to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

The flow 1000 can start at operation 1002, where the motor controller controls the motor shaft (or, more generally, the motor) to rotate such that the architectural structure covering moves (or, more particularly, a load coupled to the motor shaft to move, such as a shade to extend or retract and/or a pane to open or close). In an example, the motor is operating in a normal operation (which, as explained herein above, can be a stage of a motor-drive operation). The motor controller can control the flow of electrical current from the power source to the motor, such that the amount of the electrical current is within an operational range.

At operation 1004, the motor controller controls the motor shaft (or, more generally, the motor) to stop rotation such that the architectural structure covering stops moving (or, more particularly, the load to stop moving, such that the shade to stop extending or retracting and/or the pane to stop opening or closing). In example, upon a stop trigger, the motor controller can reduce the flow of electrical current from the operational amount to a first, smaller amount. In addition, the rotation of the motor shaft and/or the movement of the load can be monitored via one or more sensors (e.g., a Hall effect sensor). The sensor data can be fed back to the motor controller to then determine that the rotation and/or movement have stopped. The motor controller can continue to control the flow of the electrical current at the first amount or at substantially (e.g., within +/−ten percent) the first amount for a first period of time (e.g., a first hold time interval).

At operation 1006, the motor controller controls the motor shaft to rotate to a maximum hold position. In an example, upon determining that the rotation and/or movement have stopped, the motor controller performs operation 1006 by gradually reducing the flow of the electrical current from the first amount to a second amount. In a further example, this gradual reduction is triggered upon the elapse of the first period of time, where this period of time is predefined (e.g., up to a second). In yet another example, the second amount of the electrical current can be zero. In these various examples, by reducing the flow of the current to the second amount, the magnet pairs of the braking system can cause, due to their misalignment (if any) the rotation such that the maximum hold position is achieved. This maximum hold position corresponds to the north-to-south and south-to-north alignment of the inner magnet and the outer magnet.

At operation 1008, the motor controller maintains the motor shaft at the maximum hold position (and, equivalently, the load at a stationary position). In an example, the motor controller maintains the flow of the electrical current at the second amount or at substantially (e.g., within +/−ten percent) the second amount. This amount of the electrical current and the alignment of the inner magnet and the outer magnet causes the rotor shaft to be maintained at the maximum hold position. The motor can be thus operating in a back-drive mode.

At operation 1010, the motor controller controls the motor shaft to rotate out of the maximum hold position (and, equivalently, the load to move out of the stationary position, such that the shade can start extending or retracting and/or the pane to start opening or closing). In an example, at this point, the motor was operating in the back-drive mode. A start trigger is determined and causes the transition to the motor-drive mode. The motor controller controls the flow of the electrical current from the second amount or substantially second amount to ramp up according to a predefined trajectory. This electrical current flow causes the rotor shaft to start rotating. In addition, the rotation of the motor shaft and/or the movement of the load can be monitored via the one or more sensors. The sensor data can be fed back to the motor controller to then determine that the rotation and/or movement are occurring. The motor controller can continue to control the increase of the electrical current until a particular rotational velocity and/or movement speed are achieved.

At operation 1012, the motor controller controls the motor shaft to move the architectural structure covering (or, more specifically, the load) under normal operation. For example, upon an elapse of a second predefined time period, the detection of the rotation and/or movement, or the detection that the rotational velocity and/or movement speed exceed one or more thresholds, the motor control seizes the increase to the electrical current flow and controls this flow to be within the operational range of the normal operation. If needed, the amount of the electrical current can be reduced to become within the operational range.

Although operations of the flow 1000 are described as being performed once, some or all of these operations can be repeated multiple times. For example, the stoppage cycle includes operations 1004-1008. These operations can be repeated in an iterative loop for a number of iterations. The number of iterations can be predefined based on, for example, the weight, construct, or any other property of the architectural structure covering that may impact the likelihood of maintaining the motor shaft at the maximum hold position. For instance, the greater the weight is, the greater the number of iterations is. In a particular example, five iterations are used. In another example, the number of iterations can be predefined to a maximum number (e.g., five), but the loop may be repeated only as needed up to that maximum number. Whether to iterate again can depend on detecting whether the motor shaft (or the covering load) has fully stopped and is maintained in position after the completion of an iteration. Distance and time factors may be used here. Maintained in position may allow for a small rotational or distance margin for movement over a period of time (e.g., distance movement less than a quarter of an inch in a two second window).

Figure 11:
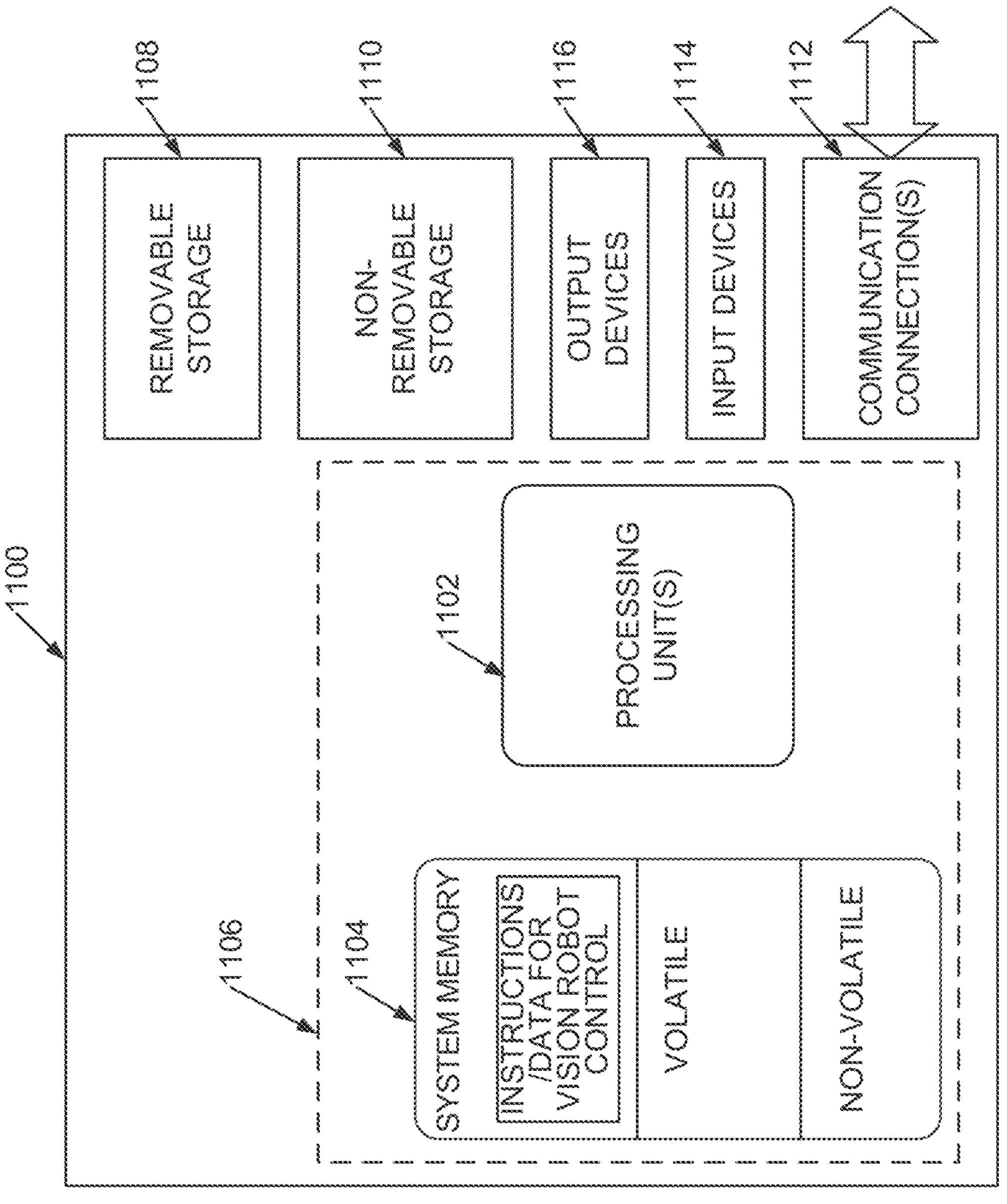
FIG. 11 illustrates a block diagram of an exemplary operating environment 1100 in which one or more of the present examples may be implemented.

FIG. 11 illustrates a block diagram of an exemplary operating environment 1100 in which one or more of the present examples may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics, such as smart phones, network PCs, minicomputers, mainframe computers, distributed computing environments that include any of the above systems or devices, and the like.

In the most basic configuration, operating environment 1100 typically includes at least one processing unit 1102 and memory 1104. Depending on the exact configuration and type of computing device, memory 1104 (instructions to perform the computer vision robot control operations disclosed herein) may be volatile (such as RAM), non-volatile (such as ROM, flash memory, etc.), or some combination of the two. This most basic configuration is illustrated in FIG. 11 by dashed line 1106. Further, environment 1100 may also include storage devices (removable, 1108, and/or non-removable, 1110) including, but not limited to, magnetic or optical disks or tape. Similarly, environment 1100 may also have input device(s) 1114 such as keyboard, mouse, pen, voice input, etc. and/or output device(s) 1116 such as a display, speakers, printer, etc. Also included in the environment may be one or more communication connections, 1112, such as LAN, WAN, point to point, etc.

Operating environment 1100 typically includes at least some form of computer-readable media. Computer-readable media can be any available media that can be accessed by processing unit 1102 or other devices comprising the operating environment. By way of example, and not limitation, computer-readable media may comprise computer storage media and communication media. Computer storage media includes volatile and nonvolatile, removable and non-removable media implemented in any method or technology for storage of information, such as computer-readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer-readable media.

The operating environment 1100 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

Examples of the embodiments of the present disclosure can be described in view of the following clauses.

Clause 1. An architectural structure covering that comprises: a covering load; a motor comprising a motor shaft that is coupled with the covering load; a magnetic brake; and a motor controller configured to: stop a rotation of the motor shaft; determine that the rotation has stopped; cause, upon determining that the rotation has stopped, an alignment of a magnetic pair of the magnetic brake, the alignment causing a further rotation of the motor shaft to a hold position; and maintain the motor shaft at the hold position.

Clause 2. The architectural structure covering of clause 1, wherein the alignment corresponds to a north-to-south and south-to-north alignments of an inner magnet and an outer magnet of the magnetic brake.

Clause 3. The architectural structure covering of any clauses 1-2, wherein stopping the rotation of the motor shaft comprises controlling a flow of electrical current to the motor to change from an operational range to a first amount.

Clause 4. The architectural structure covering of clause 3, further comprising one or more sensors, and wherein the rotation is determined to have stopped based on sensor data of the one or more sensors.

Clause 5. The architectural structure covering of any clauses 3-4, wherein causing the alignment comprises reducing the flow of the electrical current from the first amount to a second amount.

Clause 6. The architectural structure covering of clause 5, wherein maintaining the motor shaft at the hold position comprises maintaining the flow of the electrical current at the second amount or substantially the second amount.

Clause 7. The architectural structure covering of clause 6, wherein prior to the causing the alignment, the rotation is stopped for a period of time by maintaining the flow of the electrical current at the first amount or substantially the first amount during the period of time.

Clause 8. The architectural structure covering of clause 7, wherein the motor controller is further configured to: restart the rotation of the motor shaft by at least controlling the flow of the electrical current to a third amount within another predefined period of time.

Clause 9. The architectural structure covering of clause 8, wherein the motor controller is further configured to: determine that the motor shaft is rotating; and change the flow of the electrical current from the third amount to a fourth amount within the operational range.

Clause 10. A method implemented by a motor controller of an architectural structure covering, the method comprising: stopping a rotation of a motor shaft of a motor coupled to a covering load of the architectural structure covering; determining that the rotation has stopped; causing, upon determining that the rotation has stopped, an alignment of a magnetic pair of a magnetic brake of the motor, the alignment causing a further rotation of the motor shaft to a hold position; and maintaining the motor shaft at the hold position.

Clause 11. The method of clause 10, wherein stopping the rotation of the motor shaft comprises controlling a flow of electrical current to the motor to change from an operational range to a first amount.

Clause 12. The method of clause 11, wherein causing the alignment comprises reducing the flow of the electrical current from the first amount to a second amount.

Clause 13. The method of clause 12, wherein maintaining the motor shaft at the hold position comprises maintaining the flow of the electrical current at the second amount or substantially the second amount.

Clause 14. The method of clause 13, wherein prior to the causing the alignment, the rotation is stopped for a period of time by maintaining the flow of the electrical current at the first amount or substantially the first amount during the period of time.

Clause 15. The method of clause 14, further comprising: restarting the rotation of the motor shaft by at least controlling the flow of the electrical current to a third amount within another predefined period of time.

Clause 16. The method of clause 15, further comprising: determining that the motor shaft is rotating; and changing the flow of the electrical current from the third amount to a fourth amount within the operational range.

Clause 17. A non-transitory computer-readable storage medium storing instructions that, upon execution by a motor controller of an architectural structure covering, cause the architectural structure covering to perform operations comprising: stopping a rotation of a motor shaft of a motor coupled to a covering load of the architectural structure covering; determining that the rotation has stopped; causing, upon determining that the rotation has stopped, an alignment of a magnetic pair of a magnetic brake of the motor, the alignment causing a further rotation of the motor shaft to a hold position; and maintaining the motor shaft at the hold position.

Clause 18. The non-transitory computer-readable storage medium clause 17, wherein stopping the rotation of the motor shaft comprises controlling a flow of electrical current to the motor to change from an operational range to a first amount, wherein causing the alignment comprises reducing the flow of the electrical current from the first amount to a second amount, and wherein maintaining the motor shaft at the hold position comprises maintaining the flow of the electrical current at the second amount or substantially the second amount.

Clause 19. The non-transitory computer-readable storage medium clause 18, wherein prior to the causing the alignment, the rotation is stopped for a period of time by maintaining the flow of the electrical current at the first amount or substantially the first amount during the period of time.

Clause 20. The non-transitory computer-readable storage medium of any clauses 18-19, wherein the operations further comprise: restarting the rotation of the motor shaft by at least controlling the flow of the electrical current to a third amount within another predefined period of time; determining that the motor shaft is rotating; and changing the flow of the electrical current from the third amount to a fourth amount within the operational range.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. An architectural structure covering that comprises:
a covering load;
a motor comprising a motor shaft that is coupled with the covering load;
a magnetic brake; and
a motor controller configured to:
stop a rotation of the motor shaft;
determine that the rotation has stopped;
cause, upon determining that the rotation has stopped, an alignment of a magnetic pair of the magnetic brake, the alignment causing a further rotation of the motor shaft to a hold position; and
maintain the motor shaft at the hold position.

2. The architectural structure covering of claim 1, wherein the alignment corresponds to a north-to-south and south-to-north alignments of an inner magnet and an outer magnet of the magnetic brake.

3. The architectural structure covering of claim 1, wherein stopping the rotation of the motor shaft comprises controlling a flow of electrical current to the motor to change from an operational range to a first amount.

4. The architectural structure covering of claim 3, further comprising one or more sensors, and wherein the rotation is determined to have stopped based on sensor data of the one or more sensors.

5. The architectural structure covering of claim 3, wherein causing the alignment comprises reducing the flow of the electrical current from the first amount to a second amount.

6. The architectural structure covering of claim 5, wherein maintaining the motor shaft at the hold position comprises maintaining the flow of the electrical current at the second amount or substantially the second amount.

7. The architectural structure covering of claim 6, wherein prior to the causing the alignment, the rotation is stopped for a period of time by maintaining the flow of the electrical current at the first amount or substantially the first amount during the period of time.

8. The architectural structure covering of claim 7, wherein the motor controller is further configured to:
restart the rotation of the motor shaft by at least controlling the flow of the electrical current to a third amount within another predefined period of time.

9. The architectural structure covering of claim 8, wherein the motor controller is further configured to:
determine that the motor shaft is rotating; and
change the flow of the electrical current from the third amount to a fourth amount within the operational range.

10. A method implemented by a motor controller of an architectural structure covering, the method comprising:
stopping a rotation of a motor shaft of a motor coupled to a covering load of the architectural structure covering;
determining that the rotation has stopped;
causing, upon determining that the rotation has stopped, an alignment of a magnetic pair of a magnetic brake of the motor, the alignment causing a further rotation of the motor shaft to a hold position; and
maintaining the motor shaft at the hold position.

11. The method of claim 10, wherein stopping the rotation of the motor shaft comprises controlling a flow of electrical current to the motor to change from an operational range to a first amount.

12. The method of claim 11, wherein causing the alignment comprises reducing the flow of the electrical current from the first amount to a second amount.

13. The method of claim 12, wherein maintaining the motor shaft at the hold position comprises maintaining the flow of the electrical current at the second amount or substantially the second amount.

14. The method of claim 13, wherein prior to the causing the alignment, the rotation is stopped for a period of time by maintaining the flow of the electrical current at the first amount or substantially the first amount during the period of time.

15. The method of claim 14, further comprising:
restarting the rotation of the motor shaft by at least controlling the flow of the electrical current to a third amount within another predefined period of time.

16. The method of claim 15, further comprising:
determining that the motor shaft is rotating; and
changing the flow of the electrical current from the third amount to a fourth amount within the operational range.

17. A non-transitory computer-readable storage medium storing instructions that, upon execution by a motor controller of an architectural structure covering, cause the architectural structure covering to perform operations comprising:
stopping a rotation of a motor shaft of a motor coupled to a covering load of the architectural structure covering;
determining that the rotation has stopped;
causing, upon determining that the rotation has stopped, an alignment of a magnetic pair of a magnetic brake of the motor, the alignment causing a further rotation of the motor shaft to a hold position; and
maintaining the motor shaft at the hold position.

18. The non-transitory computer-readable storage medium claim 17, wherein stopping the rotation of the motor shaft comprises controlling a flow of electrical current to the motor to change from an operational range to a first amount, wherein causing the alignment comprises reducing the flow of the electrical current from the first amount to a second amount, and wherein maintaining the motor shaft at the hold position comprises maintaining the flow of the electrical current at the second amount or substantially the second amount.

19. The non-transitory computer-readable storage medium claim 18, wherein prior to the causing the alignment, the rotation is stopped for a period of time by maintaining the flow of the electrical current at the first amount or substantially the first amount during the period of time.

20. The non-transitory computer-readable storage medium of claim 18, wherein the operations further comprise:
restarting the rotation of the motor shaft by at least controlling the flow of the electrical current to a third amount within another predefined period of time;
determining that the motor shaft is rotating; and
changing the flow of the electrical current from the third amount to a fourth amount within the operational range.

* * * * *